July 9, 1968 W. J. STAHLER 3,392,266
VENDING MACHINE EQUIPMENT

Filed April 6, 1965 3 Sheets-Sheet 1

INVENTOR.
WILLIAM J. STAHLER
BY
Synnestvedt & Lechner
ATTORNEYS

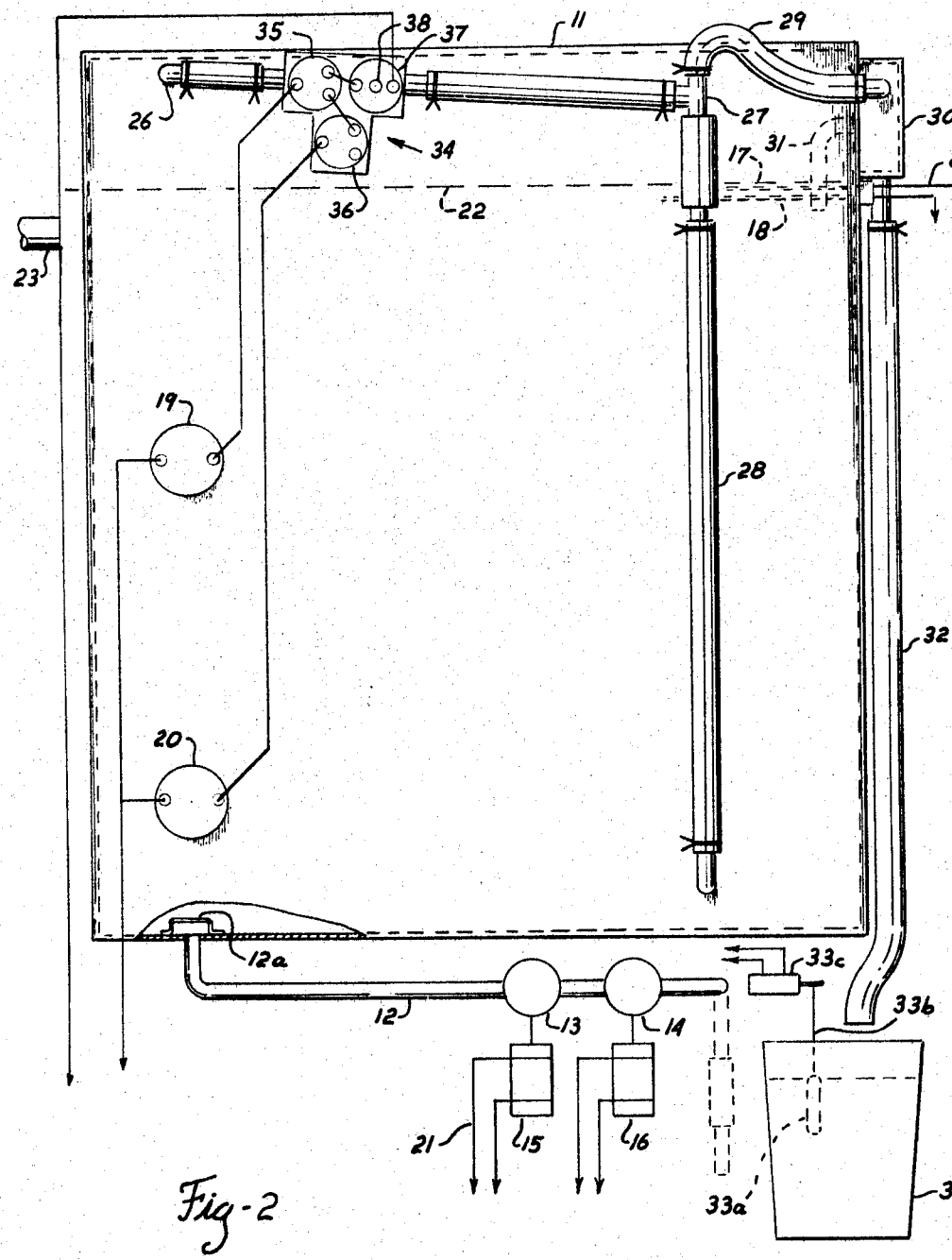

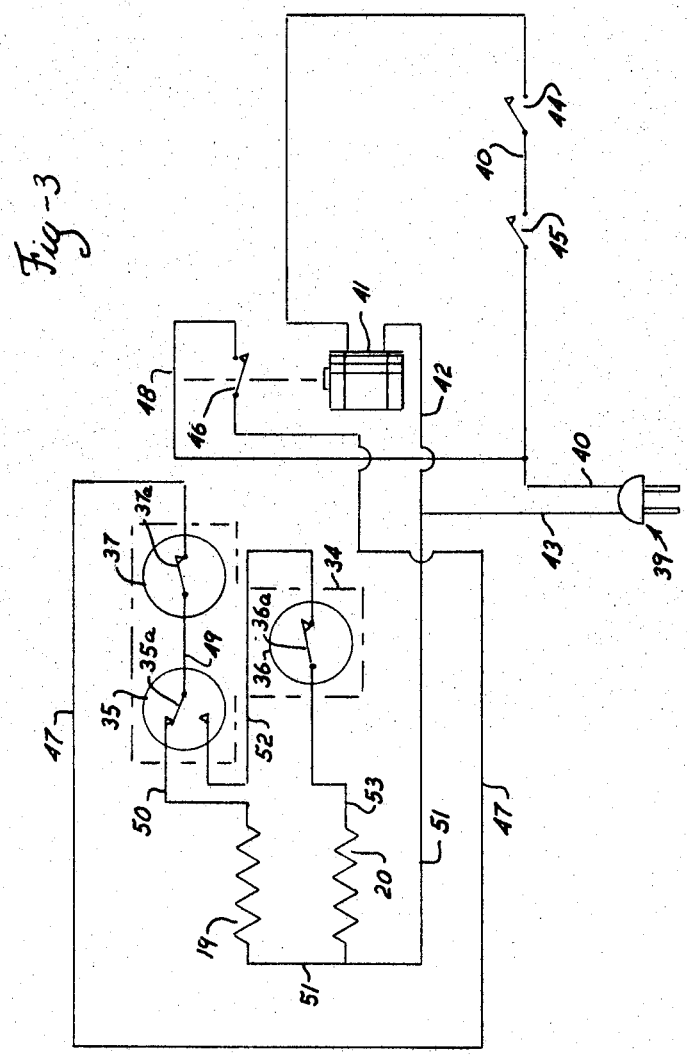

United States Patent Office 3,392,266
Patented July 9, 1968

3,392,266
VENDING MACHINE EQUIPMENT
William J. Stahler, Warminster, Pa., assignor to Rudd-Melikian, Inc., Warminster, Pa., a corporation of Pennsylvania
Filed Apr. 6, 1965, Ser. No. 446,046
8 Claims. (Cl. 219—321)

ABSTRACT OF THE DISCLOSURE

Coffee brewing equipment is provided with a hot water heater tank having upper and lower heaters controlled by first and second thermostats, respectively. The thermostats are connected to a T-shaped heat conductive plate having one portion thermally coupled to a portion of a vent pipe connected to the top of the tank whereby the heaters are alternatively operated as a function of the temperature at different portions of said plate. A third, manually-resettable thermostat mounted on the heat conductive plate is designed to open in the event that the first and second control thermostats fails to disconnect their heaters.

---

This invention relates to a temperature control system, and more particularly to apparatus for maintaining a liquid at a constant temperature very near its boiling point.

While the invention has utility whenever it is desirable to maintain a volume of liquid at a temperature very near its boiling point, it is especially useful for controlling the water temperature in coin-operated vending machines of the type in which a hot beverage such as coffee or tea is dispensed. Machines of this type must be capable of delivering adequate quantities or hot water throughout the day, particularly during peak periods such as coffee breaks and lunch periods. The water must be very near the boiling point in order to brew acceptably palatable beverages but must not be boiling since a boiling liquid might scald the consumer. In addition, the problems of handling the liquid become considerably more complex when the temperature rises above 212° F.

The problems of water temperature control become even more acute when it is desired to dispense very small quantities of strong hot coffee, for instance, of the type commonly known as "expresso." This beverage is ordinarily served in cups holding very small amounts, for example, only two or three ounces of liquid. When dealing with such small quantities of hot water, the temperature loss due to the condition of heat into the brewing chamber parts, into the discharge conduit and even into the cup itself, is so great that if the supply of water is not kept at a temperature very close to 212° F., the beverage will be too cold by the time it is mixed and served.

In solving these problems the apparatus of the present invention employs a pair of thermostats mounted on a thermally conductive plate, a portion of which plate is located so as to be heated by water vapors at the top of the tank. One of the thermostats is positioned on the plate at the point where heat is applied and controls a heater in the upper portion of the tank. This thermostat calls for more heat when the temperature of the plate is below a predetermined level. The other thermostat is positioned on the plate at a point remote from the point of application of heat and is connected to a heater located near the bottom of the tank. This second thermostat calls for heat whenever the temperature in the region of the plate where heat is applied is below a predetermined level. The two thermostats are interconnected and whenever the first thermostat ceases to call for heat, the lower heater is placed under the control of its thermostat. Whenever the temperature at the top of the tank drops below the predetermined level, the second thermostat is again disconnected from its heater and the upper heater is again reconnected.

With the foregoing in view, it may be seen that a primary object of the invention is the provision of a control system for a hot water reservoir which maintains a quantity of water within the reservoir at a temperature very near its boiling point.

Another object of the invention is the provision of a temperature control system for a liquid supply reservoir which provides for a very rapid temperature recovery rate.

A still further object of the invention is a temperature control system for a liquid supply reservoir which prevents undue build-up of pressure within the reservoir while maintaining the temperature of the fluid therein at or near its boiling point.

A still further object of the invention is the provision of means for condensing steam released from the hot water and for returning the condensate to the reservoir.

Yet another object of the invention is the provision of a hot water control system having the qualities of dependability, safety and simplicity which are essential in the vending machine equipment industry.

How the foregoing and other objects of the invention are achieved will become more fully apparent from the following detailed description and from the accompanying drawings in which:

FIGURE 2 is a side elevational view of the reservoir and control system shown in FIGURE 1;

Figure 1:
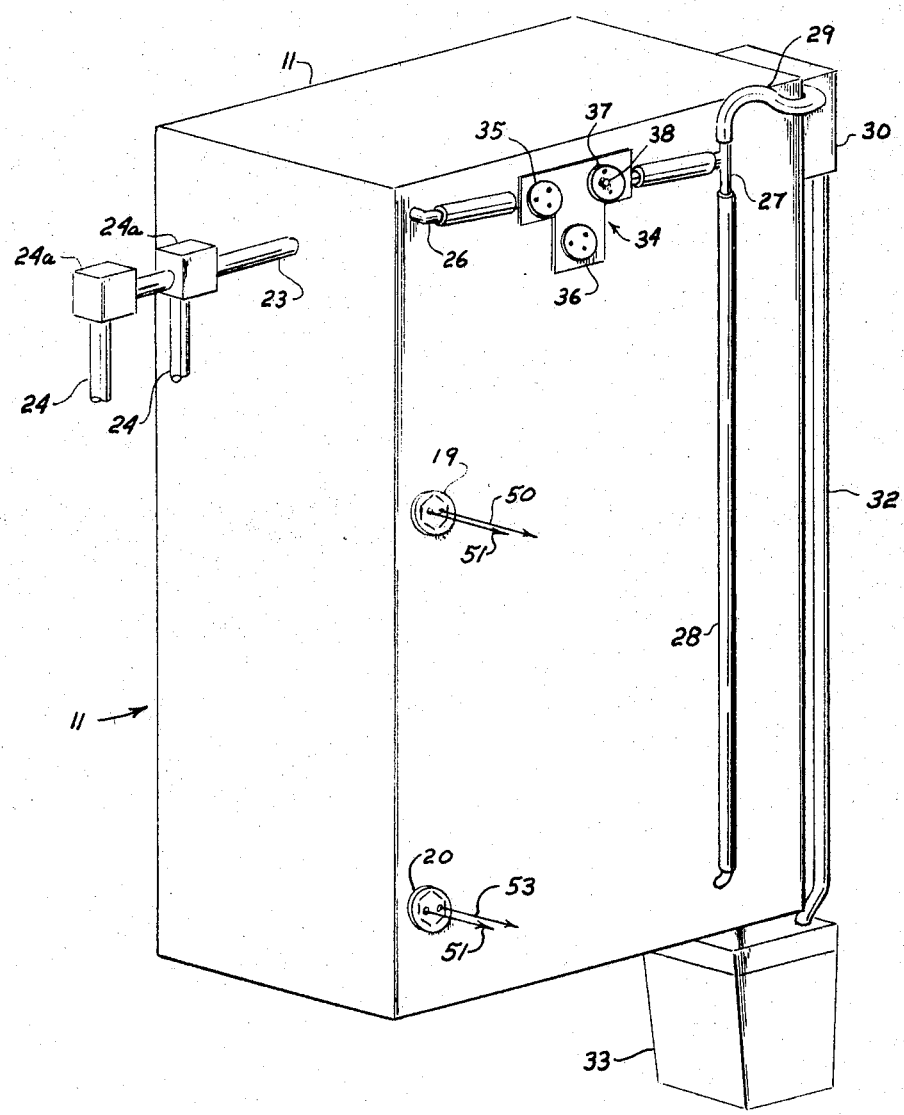
FIGURE 1 is an isometric projection of a reservoir equipped with the control system of the present invention.

FIGURE 3 is a schematic view of a portion of the control circuit used in the illustrative embodiment of the invention; and As may be seen in FIGURES 1 and 2, the illustrative form of the invention controls the temperature of water within a tank or reservoir 11 which forms a part of a typical hot beverage vending machine. The tank is supplied with water under line pressure through an inlet conduit 12 which leads into the bottom of the tank (FIGURE 2). A shield or deflector 12a is preferably placed over the inlet opening to deflect the stream of incoming water laterally so that undue turbulence is not created in the upper portion of the tank. A pair of valves 13 and 14 are placed in the line 12.

Valves 13 and 14 are controlled by solenoids 15 and 16 respectively as is shown in FIGURE 2. A pair of electrodes 18 and 17 are located near the top of the tank at the desired water level indicated by the dotted line 22. Electrodes 18 and 17 are connected in known manner to solenoids 15 by means of circuitry schematically illustrated at 21. The relay closes the valve whenever the electrode 17 is submerged, the valve being opened again as soon as electrode 18 is uncovered. Valve 14 is opened under control of relay 16 whenever the level control system is properly operating. Relay 16 closes the valve when the tank overflows by means described further on in the specification.

The tank is provided with an outlet line 23 which leads out of one side wall at a point somewhat below the water level 22. Line 23 is provided with a plurality of branch conduits 24, which are selectively connected by means of control valves 24a as is shown in FIGURE 1. The branch conduits lead to various beverage forming stations at which beverages such as coffee, hot tea and chocolate are prepared.

The reservoir 11 is provided with heating means including two electrically operated immersion-type heater elements 19 and 20. As shown in FIGURES 1 and 2, one of these heater elements is located somewhat below the other.

A steam vent pipe 26 leads out of one side of the tank at a point above the water level 22 as is best shown in FIGURE 1. Pipe 26 is inclined downwardly at a slight angle and extends along one of the tank side-walls as may be seen most clearly in FIGURE 1. The pipe 26 terminates in a horizontally disposed T-shaped fitting 27. One are of the T is connected to a standpipe 28 which in turn is connected to the tank near its bottom. Standpipe 28 is preferably formed of a transparent material such as polypropylene, thus providing a means for indicating the water level within the tank. The other arm of the T is connected to tubing 29 which leads to an overflow chamber or steam trap 30 located on one of the end walls of the tank. The overflow chamber 30 is connected with the inside of the tank by means of a piece of tubing 31, whose inlet is just below the normal water level 20. A drain 32 leads from the overflow chamber to a bucket 33 located near the bottom of the vending machine cabinet.

The venting sytem allows steam to escape through the vent pipe 26, the tubing 29, the steam trap 30, where it is condensed and flows out through the drain pipe 32 to a bucket 33. Any condensate formed in the vent pipe will be returned to the reservoir via the standpipe 28. If the reservoir overflows due to a failure of the water level control circuit to operate, the water will pass through the tubing 31, the trap 30 and out through the overflow pipe 32, to the bucket 33.

Bucket 33 is provided with a float 33a connected by a chain 33b to the arm of an overflow switch 33c, having contacts 44 shown in the circuit diagram of FIGURE 3. When the water rises above a predetermined level in the bucket 33, the contacts 44 of the switch 33c are opened to shut off both of the heaters, and the water supply, as will appear more fully hereinafter.

The water temperature within the tank is controlled according to the present invention by means which include a generally T-shaped plate 34, formed of copper or other heat conductive material. In the preferred embodiment this plate is bolted to the inclined vent pipe 26. At the point of connection of the vent pipe to the T shaped plate, the conduit wall is also formed of heat conductive material. Thus, steam escaping through the vent conduit will heat the conduit wall portion and this will in turn apply heat to the T shaped plate.

Heaters 19 and 20 are controlled by control thermostats 35, 36 and 37 which are mounted on the T shaped plate 34. These thermostats are preferably of the known "snap disc" type and are designed to open and close switch contacts at preselected temperatures. Two of the thermostats, namely thermostats 35 and 36, normally control the delivery of heat to the water, while thermostat 37 is deigned to open in the event that the aforementioned control thermostats fail to disconnect their heaters. Thermostat 37 is provided with a manually operated reset button 38 for reclosing its switch contacts to reconnect the heaters with the power supply once the cause of the malfunction is detected and corrected.

The thermostat 35 is connected to the T shaped plate 34 in the region of the plate where heat is applied. The second thermostat 36 is connected to the leg of the T at a point somewhat remote from and cooler than the point where the thermostat 35 is secured.

Power is provided for the control system and to the upper and lower heaters by the circuit illustrated in FIGURE 3. In this circuit a line plug 39 or other suitable connector connects the control circuit with a suitable source of power, for instance, the 120 volt, 60 cycle, AC line of the building where the vending machine is located. A lead 40 connects one side of the plug with one terminal of a control relay 41, the other terminal of control relay 41 being connected with the other side of the plug through leads 42 and 43. A main power switch 45 and the contacts 44 of the overflow switch 33c mentioned above are both interposed in the line 40. Control relay 41 is designed to close a pair of contacts 46 in line 48 whenever the power switch 45 closes to energize the relay 41. When the contacts 46 are closed, a circuit is completed from one side of the power supply 40 to a line 47, which extends to one terminal of the reset thermostat 37. Reset thermostat 37 is provided with a normally closed switch 37a and is connected to the thermostat 35 by a lead 49. Thermostat 35 is provided with a thermally controlled single pole double throw switch 35a. The upper contact of this switch is connected to the upper heater 19 through lead 50. The other side of the heater is connected to the return side of plug 39 through leads 51 and lead 43. The lower contact of the thermally operated switch 35a completes a circuit for the lower heater 20 through the line 52, the normally closed switch 36a of thermostat 36 and a line 53.

In operation, closure of the power switch 45, energizes relay 41 to close the contacts 46. Contacts 46 provide a path for connecting the control thermostats and the heaters to the power supply. When the tank is first filled or when the power switch is first turned on, the water in the tank is relatively cool. The upper heater is energized through line 40, line 48, switch 46, the line 47, switch 37a, line 49, switch 35a, line 50, line 51 and line 43. Upper heater 19 will supply heat to the tank until the hot vapors passing out through the slightly inclined vent conduit heat the horizontal portion of the T shaped plate to the predetermined level at which the thermostat is designed to operate, for instance 165° F. At this temperature the thermostat moves the switch from the upper position shown in FIGURE 3 to its lower position to complete a circuit through the line 47, switch 37a, line 49, switch 35a, the line 52, the closed contacts 36a of the thermostat 36, the line 53, the heater 20, the line 51 and the line 43 which returns to the power supply. The upper heater 19 is now disconnected, and since the lower or leg portion of the T-shaped plate is somewhat cooler than the region where heat is applied, the thermostat 36, also set to respond at 165° F., connects the lower heater with the power supply. Heat is delivered by the lower heater to heat the water in the bottom of the tank and this will continue until either the entire tank is heated to the desired level or until water is drawn off at a great enough rate to cause the overall contents of the tank to be cooled. When this happens, the upper heater is again given priority, since the thermostat 35 will move the switch 35a to its upper position.

In the preferred embodiment, the thermostat 36 is positioned on the plate 34 at a point which is about 7° F. cooler than the point of application of the thermostat 35. The temperatures at which the thermostats respond as well as the relative location of these thermostats will, of course, vary somewhat depending upon a number of factors such as the size and thermal conductivity of the plate 34, the thermal conductivity of the vent pine 26 and the point of connection of the plate 34 to the vent pipe 26 and its relative location with respect to the tank.

If water overflows and fills bucket 33 contacts 44 of float control switch 33c are allowed to open, and the control relay 41 is de-energized. This breaks the circuit to the heaters and also de-energized the relay 16, closing the valve 14.

As a precaution against burning out heaters 19 and 20, manually operable switch or plug connection, not shown, may be provided in lines 47, 51, to prevent heating until the heaters are fully submerged.

From the foregoing detailed description of the illustrative embodiment of this invention, numerous advantageous characteristics will be apparent to those skilled in the art, but it is desired to emphasize the following.

The control system always operates to give priority to heating the water at the top of the tank, thereby insuring that a supply of hot water is very quickly ready for dispensing, even though a large volume of water has been withdrawn and the tank is largely filled with relatively cool water. As soon as the water at the top of the tank is at the desired dispensing temperature, the control system will then cause the lower heater to deliver heat, and this will continue until the withdrawal rate reaches the point where the water temperature at the top of the tank again begins to drop. Whenever this occurs the upper heater will again be given priority.

Among the features of the invention, it should be noted that the action of heat transfer from the steam within the vent conduit 26 to the relatively large area of plate 34 causes most of the steam to condense. The condensate is recovered by the standpipe 28.

In summary, the present invention provides a simple control means for maintaining a supply of water at a temperature very near its boiling point. The apparatus functions in a manner which provides for accurate synchronization of the operation of the two heaters so the water about to be delivered to the beverage mixing station is always heated first.

I claim:

1. In coffee brewing equipment having a tank in which to heat water and having a cold water inlet near the bottom and a hot water outlet near the top, the combination comprising:
   upper and lower controllable heaters for said tank;
   a heat conductive plate outside the tank;
   a vent pipe connected to the top of the tank and constructed and arranged to apply heat to one region of the plate;
   a first thermostat on the plate in the region where heat is applied, said first thermostat controlling said upper heater;
   a second thermostate at a point on the plate somewhat removed from, and slightly cooler than the region where heat is applied, said second thermostat being connectible with the lower heater to control the delivery of heat to the tank;
   means actuated by the first thermostat to turn off said upper heater and to connect the second thermostat to the lower heater when the first thermostat ceases to call for heat and to disconnect the second thermostat and to turn on said upper heater when the first thermostat again calls for heat.

2. Apparatus according to claim 1, wherein said thermostats are designed to respond at the same temperature.

3. Apparatus according to claim 1 wherein said vent pipe is inclined slightly downwardly from the point of connection with the tank, and further including a substantially vertically extending standpipe connected to the vent pipe at the lowermost point thereof, said standpipe leading into the tank near the bottom thereof.

4. Apparatus according to claim 2 wherein said vent is connected to the tank above the level of the water therein.

5. Apparatus according to claim 3 wherein said standpipe is transparent.

6. Apparatus according to claim 1 wherein said plate is substantially T shaped, the horizontal bar of said T being in contact with the heat conductive portion of the vent pipe and further wherein said second thermostat is spaced away from the first thermostat on the vertical bar of the T.

7. Apparatus according to claim 6 wherein the temperature gradient in the plate between the point of application of the first and second thermostats is about 7° F.

8. Apparatus for controlling the temperature of a supply of water comprising a supply vessel having an inlet near the bottom through which water under pressure is admitted, a hot water outlet near the top through which hot water is withdrawn in response to varying demand, means for maintaining the liquid within said tank at a substantially constant level comprising a valve in said water inlet, and means to close said valve whenever the water rises to the predetermined level;
   upper and lower heaters for said tank and circuit means for energizing said heaters;
   a first thermostat including a first switch for connecting said upper heater to said energizing circuit when the thermostat calls for heat;
   a second thermostat including a second switch for connecting said lower heater to said circuit means;
   a vent pipe leading from the top of the tank;
   a heat conductive plate adjacent said vent pipe, said vent pipe being constructed and arranged to apply heat to one region of said plate;
   said first thermostat being responsive to changes in the temperature of the region of the plate where heat is applied, said second thermostat being responsive to the temperature of the plate at a point spaced from and slightly cooler than the region where heat is applied,
   and control circuit means including said first switch to disconnect said second switch from the heater energizing circuit and to connect said upper heater to the energizing circuit when said first thermostat calls for heat and to reconnect the second switch with the energizing circuit when the first thermostat ceases to call for heat.

References Cited

UNITED STATES PATENTS 3,254,796  6/1966  Wright _____ 219—330

RICHARD M. WOOD, *Primary Examiner.*

A. L. ALBRITTON, *Assistant Examiner.*